May 5, 1959
J. C. MARINACE ET AL
2,885,562
PHOTOELECTRIC DEVICE
Filed May 9, 1955
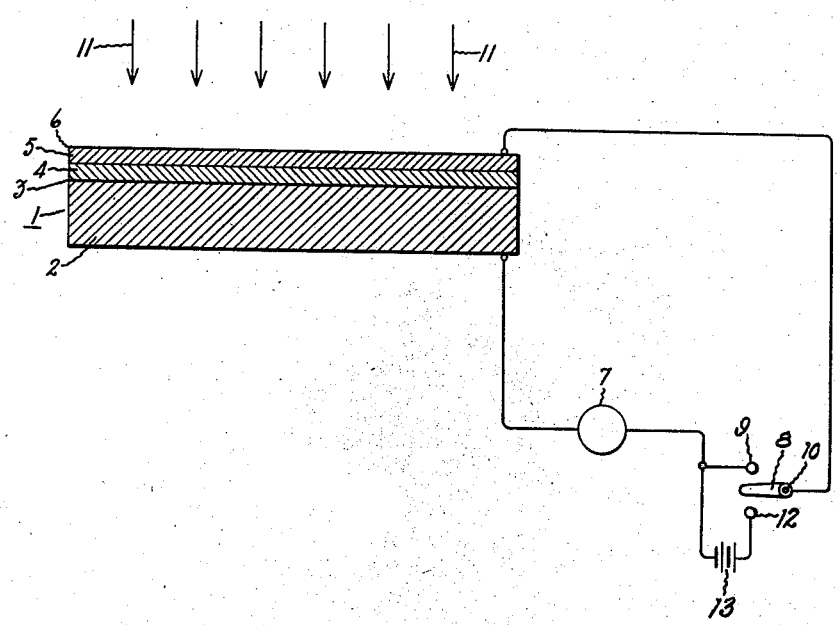
Inventors:
John C. Marinace,
Ubert Cocca,
by Merton D Morse
Their Attorney.

2,885,562
PHOTOELECTRIC DEVICE

John C. Marinace, Syracuse, and Ubert Cocca, Schenectady, N.Y., assignors to General Electric Company, a corporation of New York Application May 9, 1955, Serial No. 506,934

11 Claims. (Cl. 250—83.3)

Our invention relates to a photoelectric device. More particularly the invention relates to a photoelectric device which is useful in the detection of high quantum energy electromagnetic radiation.

Various means are presently used to detect high quantum or high energy radiation such as X-rays and gamma rays and the like. One means of such detection employs a phosphor screen which is excited by the high energy radiation incident thereon to produce light waves which are transmitted to a separate solid-type photocell having in circuit therewith a multiplying device and meter or other suitable means of measuring the light effect and, hence, the effect of the radiation. The light from the phosphor must travel through the space between it and the photocell and then penetrate a part of the photocell in order to reach the sensitive indicating portion. Certain losses in the intensity of the light are attendant upon such transmission. Such devices additionally entail the use of separate phosphors and photocell units.

An object of our invention is to provide a detector for high energy radiation such as X-rays and gamma rays and the like, which is photovoltaic or photoconductive in nature or capable of indicating such radiation without the use of photomultiplier tubes and the like.

A further object of our invention is to provide a photoelectric device for the detection of high energy radiation which is self-contained and compact in construction.

A further object of our invention is to provide a photoelectric device which is better capable of detecting higher energy electromagnetic radiation.

Another object of our invention is to provide such a device which is characterized by greater sensitivity as compared to radiation detectors which are made up of a plurality of separate units.

Briefly, our invention comprises a self-contained and compact photoelectric device having photovoltaic and photoconductive characteristics. For example, a P-type semiconductor layer having a suitable first electrode on one side has on its second side a layer of N-type semiconductive material which forms therewith a broad area junction. The N-type material also has phosphorescent properties when exposed to higher-energy radiation as may bathe the P-type and N-type layers. A counterelectrode is formed on the free surface of the N-type phosphor. This electrode need not be very thin for detection of gamma and X-rays, since these have high penetrating power. Indeed, some phosphorescent light might be lost if the electrode were too thin. However, in the case of beta rays the penetrating power is much less, and the electrode is best quite thin. High energy radiation incident on the counterelectrode passes through this electrode into the N-type phosphor, generating light. With a potential applied across the electrodes of the device, a current flows, and the current changes upon exposure of the device to high energy radiation due to the photoconductive effect of the N-type and P-type semiconductors such as cadmium selenide, and selenium, respectively. With no potential across the electrodes a current will flow under exposure to high energy radiation due to the photovoltaic effect. In either case, the current produced is dependent upon the radiation incident upon the device and thus may be used as a measure of the amount of radiation.

The features of our invention which we believe to be novel and useful are set forth in the claims appended hereto. Our invention, however, together with further objects and advantages thereof will better be understood from a consideration of the following description and the drawing in which the single figure sets forth a typical embodiment of the invention.

Referring to the drawing, there is shown a photoelectric device 1 constructed according to our invention. A baseplate or first electrode 2 is provided as one of the contacts for placing the device in circuit with other components. Aluminum is preferred as a first electrode because it is relatively inexpensive, light in weight, and oxidation resistant. Other materials, however, may be used, examples of which are iron, steel, tin, and nickel. In order to make a low-resistance ohmic contact between electrode 2 and the selenium to be placed thereon, a flash coating 3 of a contact-improving material such as bismuth, tin, or nickel is preferably formed on the upper surface of the electrode 2. This can be done by vacuum deposition, electroplating, or other means, all well known in the art. Next there is prepared on the bismuth or other coating a layer 4 of P-type selenium for example. The selenium is preferably vacuum deposited on the bismuth coating and should be crystalline in nature. A vacuum deposited amorphous selenium layer can be crystallized by a suitable heat treatment which is of a time-temperature nature. For example, heating the layer in air at 215° C. for about 45 minutes will convert a 0.003 inch thick amorphous layer of selenium to the crystalline state. There is next deposited on the P-type crystalline layer 4 a layer 5 of a phosphor which also has N-type semiconductor properties. Silver-activated cadmium selenide is an example of such a material and is preferred for our invention. Another such N-type phosphor is silver-activated cadmium sulfide. A divided phosphor in a matrix of N-type semiconductor material can also be used. Others will occur to those skilled in the art. The phosphor layer is also preferably vacuum-deposited in any of the usual manners. A second or counterelectrode 6 is also vacuum-deposited on the N-type phosphor layer. This electrode is preferably of cadmium or zinc or any metal or alloy which has a work-function approximating that of these two metals.

For the case of gamma or X-radiation, the thickness of electrode 6 is such that it is opaque to visible light so that the generated light is reflected from it toward the junction, yet not too thick to prevent the penetration of the lower-energy X- and gamma radiation. For purposes of illustration, a thickness of about 0.00025 inch to 0.001 inch is satisfactory. For the case of high-energy beta rays, however, the penetrating power is much lower, and, the thickness of the electrode 6 is less than 0.00025 inch or semi-transparent or transparent.

In series circuit with the electrodes 2 and 6 is a current indicating device 7 such as a microammeter. With the switch 8 connecting points 9 and 10 and with high energy radiation, indicated by lines 11, directed on the cell, the cell 1 performs in a photovoltaic manner; that is, holes and electrons are created about the P-N junction of the cell by the visible light emitted by the phosphor (which light in turn is created by the high-energy radiation) generating an electric current. With the switch 8 bridging contacts 10 and 12, source 13 of electromotive force is introduced into the circuit and provides a potential across the cell or device 1, the polarity of this potential being such that the N-layer is positive and the P-layer negative. A current then flows through the cell, which, in general, is small compared to the current which would flow when the polarity is in the opposite sense. When high-energy radiation is incident upon the cell and visible light is generated in the N-type layer the visible light again creates holes and electrons about the P-N junction; this lowers the resistance of the junction, and an increased current then flows through the circuit. Here, again, as in other photoconductive cells the current, for a fixed external potential, is dependent upon the intensity of the high-energy radiation, and is generally proportional to it.

The components of the device may be of varying thicknesses. A typical device, however, which functions well in the detection of X-rays and gamma rays has a P-N type broad area junction of about one square inch. The first or base electrode is preferably, though not necessarily, about one-sixteenth to one thirty-second inch thick. The contact improving layer of bismuth, tin, nickel, and the like is merely a flash coating. The P-type layer may also vary but in a typical device is about three mils thick. The N-type phosphor layer typically ranges from about 80 to 300 micrograms per square centimeter with a coating of 300 micrograms per square centimeter preferred. As pointed out above, the counterelectrode may vary from transparency to opacity to visible light.

A cell made to the above preferred specifications were exposed to 50,000 roentgens per hour of 140 kilovolt peak X-ray radiation. With selenium as the P-type material and silver-activated cadmium sulfide as the N-type phosphor the photovoltaic response was 0.2 microampere per square centimeter measured with a 20 microampere, 1000 ohm microammeter. The photoconductive current with a dark current bias of 133 microamperes per square centimeter across the cell was 5.3 microamperes per square centimeter. Using selenium again as the P-type layer and silver-activated cadmium selenide as the N-type phosphor layer the photovoltaic effect produced a current of 0.26 microampere per square centimeter, while the photoconductive effect produced 2.0 microamperes per square centimeter.

The photovoltaic character of our cells enables them to operate control devices directly without the use of power supplies or amplifiers. This is particularly useful in monitoring and safety applications where compact, easily portable, units are desirable. In installations where accessory equipment is conveniently used, the photoconductive effect of the cell can be utilized. They are, furthermore, compact and self-contained requiring no special enclosing envelope or protection.

Many applications of our invention will occur to those skilled in the art. Besides operating control devices upon activation by high energy radiation it may be incorporated into a camera tube which may hence be made sensitive to X-ray or gamma ray radiation for transmission or projection purposes.

As compared to the usual cadmium sulfide crystal radiation detectors, our cell operating photovoltaically opens an entire new field of use.

What we claim as new and desire to secure by Letters Patent of the United States is:

1. A high quantum energy radiation sensitive photoelectric device comprising a layer of P-type material and a layer of N-type phosphor material on said P-type layer, said layers forming a broad area P-N junction.

2. A high quantum energy radiation sensitive photoelectric device comprising a P-type material and N-type phosphor material, said P-type and N-type materials having a broad area junction therebetween.

3. A high quantum energy radiation sensitive photoelectric device comprising P-type semiconductor material and N-type semiconductor phosphor material, said P-type and N-type materials having a broad area junction therebetween.

4. A high quantum energy radiation sensitive photoelectric device comprising N-type semiconductor material and P-type semiconductor phosphor material, said P-type and N-type materials having a broad area junction therebetween.

5. A high quantum energy radiation sensitive photoelectric device comprising N-type semiconductor phosphor material and P-type semiconductor phosphor material, said P-type and N-type material having a broad area junction therebetween.

6. A high quantum energy radiation detection device comprising a first electrode, a coating of a material on said electrode which makes a low resistance ohmic contact between said electrode and a layer of P-type material on said coating, a layer of N-type semiconductor phosphor material on said P-type material and forming therewith a broad area junction, a second electrode on said N-type semiconductor phosphor material and means in circuit with said electrodes to detect a current in said device produced by the incidence thereon of high energy radiation.

7. A high energy radiation detection device comprising a first electrode, a coating of a material on said electrode which makes a low resistance ohmic contact between said electrode and a layer of P-type material on said coating, a layer of N-type semiconductor phosphor material on said P-type material and forming therewith a broad area junction, a second electrode on said N-type semiconductor phosphor material and means in circuit with said electrodes to detect a current in said device produced by the incidence therein of high energy radiation, the second electrode being sufficiently thick to render it opaque to visible light while transparent to high energy radiation such as X-rays and gamma rays.

8. A high energy radiation detection device comprising a first electrode, a coating of a material on said electrode which makes a low resistance ohmic contact between said electrode and a layer of P-type material on said coating, a layer of N-type semiconductor phosphor material on said P-type material and forming therewith a broad area junction, a second electrode on said N-type semiconductor phosphor material and means in circuit with said electrodes to detect current in said device produced by the incidence thereon of high energy radiation, the second electrode being semitransparent to visible light and high energy beta radiation.

9. A high quantum energy radiation device comprising a first electrode, a layer of P-type material contiguous to said first electrode, a coating of material on said first electrode interposed between said first electrode and said P-type layer and making a low-resistance ohmic contact therebetween, a layer of N-type semiconductor phosphor material on said P-type material and forming therewith a broad area junction, a second electrode on said N-type semiconductor phosphor material and a source of voltage and means in circuit with said electrodes to detect current variations in said device produced by variations of the high quantum energy radiation incident thereon.

10. A high quantum energy radiation device comprising a first electrode, a layer of P-type material contiguous to said first electrode, a coating of material on said first electrode interposed between said first electrode and said P-type layer and making a low-resistance ohmic contact therebetween, a layer of N-type semiconductor phosphor material on said P-type material and forming therewith a broad area junction, a second electrode on said N-type semiconductor phosphor material and a source of voltage and means in circuit with said electrodes to detect current variations in said device produced by variations of the high quantum energy radiation incident thereon, the second electrode being sufficiently thick to render it opaque to visible light while transparent to such high quantum energy radiation such as X-rays and gamma rays.

11. A high quantum energy radiation device comprising a first electrode, a layer of P-type material contiguous to said first electrode, a coating of material on said first electrode interposed between said first electrode and said P-type layer and making a low-resistance ohmic contact therebetween, a layer of N-type semiconductor phosphor material on said P-type material and forming therewith a broad area junction, a second electrode on said N-type semiconductor phosphor material and a source of voltage and means in circuit with said electrodes to detect current variations in said device produced by variations of the high quantum energy radiation incident thereon, the second electrode being semitransparent to visible light and high quantum energy radiation.

References Cited in the file of this patent
UNITED STATES PATENTS

| | | |
|---|---|---|
| 2,645,721 | Williams | July 14, 1953 |
| 2,691,076 | Moore et al. | Oct. 5, 1954 |
| 2,699,511 | Sheldon | Jan. 11, 1955 |